United States Patent
Giles et al.

(10) Patent No.: US 7,630,801 B2
(45) Date of Patent: Dec. 8, 2009

(54) SYSTEM AND METHOD FOR RETRIEVING AND DISPLAYING VEHICLE CONTROL UNIT DATA

(75) Inventors: Peter Giles, Ypsilanti, MI (US); Donald Oryschak, Northville, MI (US); Duncan Borthwick, Plymouth, MI (US); Brian Keyse, Farmington Hills, MI (US); John Harris, Plymouth, MI (US)

(73) Assignee: Ford Motor Company, Dearborn, MI (US)

( * ) Notice: Subject to any disclaimer, the term of this patent is extended or adjusted under 35 U.S.C. 154(b) by 737 days.

(21) Appl. No.: 11/154,459

(22) Filed: Jun. 16, 2005

(65) Prior Publication Data

US 2006/0287776 A1 Dec. 21, 2006

(51) Int. Cl.
*G01M 17/00* (2006.01)
*G06F 19/00* (2006.01)
*G06F 7/00* (2006.01)

(52) U.S. Cl. .............................. 701/29; 701/32; 701/35; 701/51; 701/115

(58) Field of Classification Search ............... 701/1, 701/29, 31, 32, 33, 35, 36, 51, 53, 102, 114, 701/115; 307/9.1, 10.1; 340/438, 439; 711/202; 703/27

See application file for complete search history.

(56) References Cited

U.S. PATENT DOCUMENTS

| | | | |
|---|---|---|---|
| 5,555,498 A * | 9/1996 | Berra et al. | 701/33 |
| 6,360,145 B1 * | 3/2002 | Robinson | 701/35 |
| 6,636,790 B1 * | 10/2003 | Lightner et al. | 701/33 |
| 6,701,233 B2 * | 3/2004 | Namaky et al. | 701/33 |
| 6,738,696 B2 * | 5/2004 | Oi | 701/29 |
| 6,799,106 B2 * | 9/2004 | Fukushima et al. | 701/48 |
| 7,124,051 B2 * | 10/2006 | Patterson et al. | 702/122 |
| 2003/0050747 A1 | 3/2003 | Kamiya | 701/33 |
| 2003/0163664 A1 | 8/2003 | Kanda | 711/202 |
| 2003/0167112 A1 | 9/2003 | Akiyama | 701/36 |
| 2004/0088087 A1 * | 5/2004 | Fukushima et al. | 701/32 |
| 2005/0159923 A1 * | 7/2005 | Huang | 702/183 |
| 2005/0182535 A1 * | 8/2005 | Huang | 701/29 |
| 2005/0267655 A1 * | 12/2005 | Gessner | 701/29 |

FOREIGN PATENT DOCUMENTS

JP 9200234 A 7/1997

* cited by examiner

*Primary Examiner*—Edward Pipala
(74) *Attorney, Agent, or Firm*—David B. Kelley; MacMillan, Sobanski & Todd, LLC (57) ABSTRACT

A system and method for retrieving and displaying data from an onboard memory of an electronic control unit in a vehicle is disclosed. The electronic control unit includes at least one parameter identifier that defines an address for a first data structure. The first data structure includes information on the amount and location of the data in the nonvolatile memory, as well as a version document number corresponding to a version document stored in a scan tool. The scan tool can access the parameter identifier and onboard data by the entry of an identifier number. The retrieved data is inserted into the version document for display.

20 Claims, 9 Drawing Sheets

Transmission Adaptive Table Data
Component Type = 3
Version = 2

Adaptive Boost Time for Coast Clutch
  Conversion = milliseconds to seconds (x .001)
  Units = seconds
  Precision = .xxx
  Row name = transmission oil temperature (deg. F)
  Column name = engine speed (RPM)

{Location for inserting table 00 converted data}

Adaptive Boost Time for Overdrive Clutch
  Conversion = milliseconds to seconds (x.001)
  Units = seconds
  Precision = .xxx
  Row name = Transmission oil temperature (deg. F)
  Column name = engine speed (RPM)

{Location for inserting table 01 converted data}

1A–2A Adaptive Start Pressure for On-coming Element
  Conversion = integer to decimal (x .25)
  Units = pounds per square inch
  Precision = .xxx
  Row Name = engine torque (foot-pounds)
  Column name = turbine speed (RPM)

{Location for inserting table 02 converted data}

•
•
•

6M–5M Adaptive Start Pressure for On-coming Element
  Conversion = integer to decimal (x .25)
  Units = pounds per square inch
  Precision = .xxx
  Row Name = Not Applicable
  Column name = output shaft speed (RPM)

{Location for inserting table 26 converted data}

Fig. 6

Transmission Adaptive Table Data
Component Type = 3   Version = 2

Adaptive Boost Time for Coast Clutch
  Conversion = milliseconds to seconds (x .001)
  Units = seconds
  Precision = .xxx
  Row name = transmission oil temperature (deg. F)
  Column name = engine speed (RPM)

| Con. Data | Con. Data | Con. Data | Con. Data | Con. Data |
|---|---|---|---|---|
| ⋮ | ⋮ | ⋮ | ⋮ | ⋮ |
| Con. Data | Con. Data | Con. Data | Con. Data | Con. Data |

Adaptive Boost Time for Overdrive Clutch
  Conversion = milliseconds to seconds (x.001)
  Units = seconds
  Precision = .xxx
  Row name = Transmission oil temperature (deg. F)
  Column name = engine speed (RPM)

| Con. Data | Con. Data | Con. Data | Con. Data | Con. Data |
|---|---|---|---|---|
| ⋮ | ⋮ | ⋮ | ⋮ | ⋮ |
| Con. Data | Con. Data | Con. Data | Con. Data | Con. Data |

1A-2A Adaptive Start Pressure for On-coming Element
  Conversion = integer to decimal (x .25)
  Units = pounds per square inch
  Precision = .xxx
  Row Name = engine torque (foot-pounds)
  Column name = turbine speed (RPM)

| Con. Data | Con. Data | Con. Data | Con. Data | Con. Data | Con. Data | Con. Data |
|---|---|---|---|---|---|---|
| ⋮ | ⋮ | ⋮ | ⋮ | ⋮ | ⋮ | ⋮ |
| Con. Data | Con. Data | Con. Data | Con. Data | Con. Data | Con. Data | Con. Data |

⋮

6M-5M Adaptive Start Pressure for On-coming Element
  Conversion = integer to decimal (x .25)
  Units = pounds per square inch
  Precision = .xxx
  Row Name = Not Applicable
  Column name = output shaft speed (RPM)

| Con. Data | Con. Data | Con. Data | Con. Data | Con. Data | Con. Data | Con. Data |
|---|---|---|---|---|---|---|

SYSTEM AND METHOD FOR RETRIEVING AND DISPLAYING VEHICLE CONTROL UNIT DATA

BACKGROUND OF INVENTION

The present invention relates to data stored onboard a vehicle's electronic control unit, and more particularly to a system and method for retrieving, converting and formatting data from the electronic control unit in the vehicle.

The software employed onboard vehicles' electronic control units (ECU) is becoming more capable and complex, and the amount of data being processed is increasing dramatically. Some of this data is stored in nonvolatile memory—also called keep alive memory (KAM)—which can be retrieved and processed at a later time. The ability to efficiently obtain and process this ECU data from the nonvolatile memory may facilitate the verification of the quality of the design, manufacturing and calibration of various electronic control systems. This ECU data may be particularly useful during development testing. This ECU data may also be used to obtain operator driving habits, detect degraded components, and assist in solving service concerns in the field. Consequently, storing data in nonvolatile memory onboard the ECU and retrieval of this data is a very sought-after function.

An example of such a desirable use is the storing and retrieval of data related to a transmission adaptive pressure table. This data may be employed by engineering and testing personnel to determine the quality of the design, manufacturing and calibration of the pressure control system on developmental and durability test vehicles. Other examples of desirable uses for data stored in ECU nonvolatile memory relate to parametric data—also called flight recorder data. Such parametric data may include electronic throttle control data and transmission fault data. This data may be later retrieved and employed to help solve service concerns in the field.

While retrieving this ECU data may be desirable, this increases the complexity of the onboard software needed to store this data, increases the size requirements of the onboard memory, and increases the load on the data communication network. Thus, locating and retrieving the data is a more complex and time-consuming process than is desirable. Moreover, different vehicle models and different model year vehicles may not even store the data for a particular vehicle function in the same format or locations. This further increases the complexity and time taken to retrieve the data since one must find out where the data is stored before being able to retrieve it.

Since the amount of data to be stored in the onboard memory of the vehicle is large and increasing as newer vehicles and systems are produced, much of the data is stored as raw data. That is, it is not formatted or labeled for ease of use by vehicle developers or service technicians since doing so would further increase the amount of information stored in onboard memory and increase the amount of data that would have to be transferred through the data communications network when retrieving the data.

Thus, it is desirable to have an ECU data retrieval and formatting system and process that can operate in a generic manner across different vehicle lines and model years to easily allow one to retrieve the onboard data for a particular vehicle function and have that data presented in a user-friendly format. Moreover it is desirable that such a system and process can accomplish these functions while minimizing both the onboard memory requirements and the load (bandwidth required) on the data communication network.

SUMMARY OF INVENTION

According to an aspect of the invention, there is provided a method of retrieving and displaying data from an onboard memory of an electronic control unit of a vehicle, the method comprising the steps of: communicating an identifier number from a scan tool to the electronic control unit, wherein the identifier number is associated with a vehicle component or a vehicle function; communicating, from the electronic control unit to the scan tool, a memory address for a first data structure from a parameter identifier corresponding to the identifier number; communicating, from the electronic control unit to the scan tool, an amount, formats and locations of data in the onboard memory; communicating, from the electronic control unit to the scan tool, a version document number; retrieving the data from the onboard memory to the scan tool; storing a version document corresponding to the version document number in the scan tool; inserting the retrieved data from the onboard memory in the version document; and displaying the version document with the retrieved data inserted therein.

According to another aspect of the invention, there is provided a system for retrieving and displaying data from a vehicle. The system may include an electronic control unit and a scan tool. The electronic control unit is located in the vehicle and has nonvolatile memory including a parameter identifier with a changeable memory address stored therein that is accessible via an identifier number associated with a vehicle component or function, and a first data structure beginning at the memory address that includes amount, location, and version document number information. The scan tool includes a device for selectively communicating with the electronic control unit, and also includes a mass storage device with a version document stored therein corresponding to the version document number information stored in the nonvolatile memory of the electronic control unit, and a display capable of displaying the version document with data retrieved from the vehicle inserted therein.

According to yet another aspect of the invention, there is provided an electronic control system for use in a vehicle including a data communication network and an electronic control unit. The data communication network is adapted to selectively communicate with a scan tool. The electronic control unit includes a controller operatively engaging the data communication network to receive and transmit data thereon, and nonvolatile memory in communication with the controller. The nonvolatile memory includes a parameter identifier having a memory address for accessing a first data structure, wherein the first data structure includes a first member indicative of an amount of data, a second member indicative of a vehicle function to which the data relates, and a third member indicative of a corresponding external document for inserting the data therein and displaying the external document. The first data structure may also include a fourth member indicating a location of a second data structure containing formatting information for the data and a fifth member indicating a location of a third data structure containing memory address information for the data.

An advantage of an embodiment of the present invention is that a single generic process can be employed to quickly and easily retrieve and present the data in a usable format across multiple vehicle lines and model years. Even variations in amount, types, formats, attributes, conversions, and locations of the stored data are easily accommodated by this single process.

Another advantage of an embodiment of the present invention is that the data is presented in a readily usable format while minimizing the on-board memory requirements for the vehicle. Moreover, in minimizing the on-board memory requirements, the amount of data flowing over the data communication network when retrieving the data is reduced.

A further advantage of an embodiment of the present invention is that one can retrieve the data without knowing exactly where the data is located in the onboard memory, the format of the data, or the amount of data. Thus, even if the ECU is updated, one may readily retrieve the desired data in a usable format without knowing how the updates changed the structure or location of the data stored in the onboard memory.

DETAILED DESCRIPTION

Figure 1:
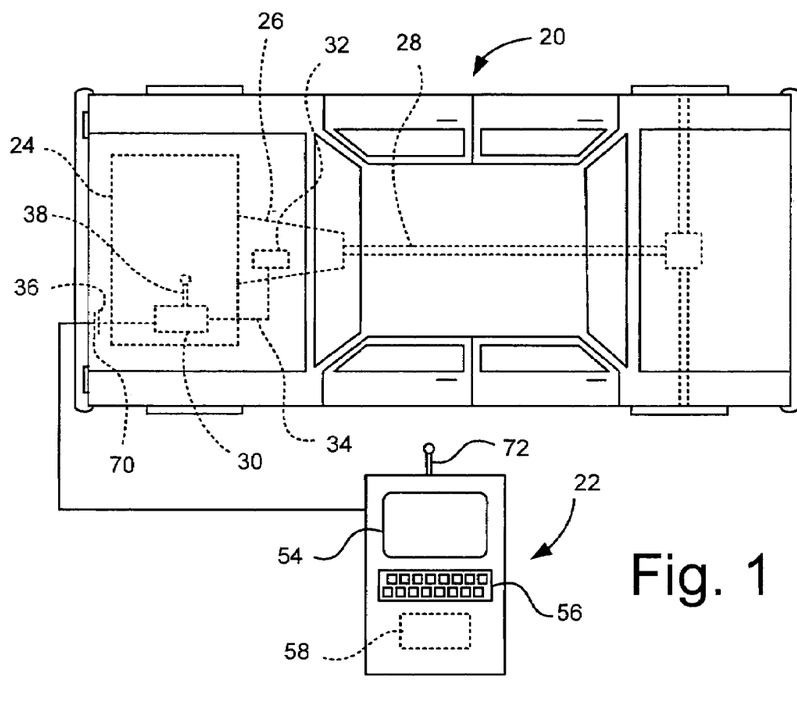
FIG. 1 is a schematic view of a vehicle and scan tool in accordance with an embodiment of the present invention.
Figure 2:
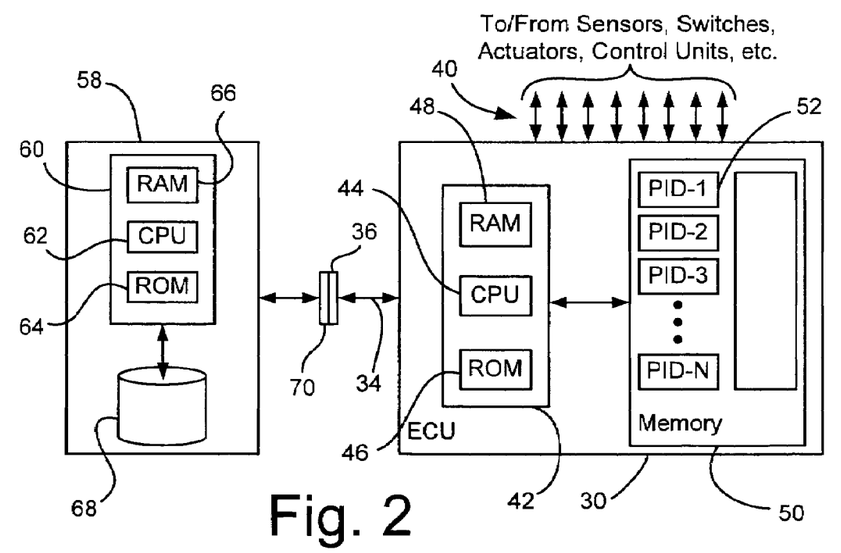
FIG. 2 is a schematic view of a vehicle electronic control unit in communication with a scan tool processor in accordance with the present invention.

FIGS. 1-2 illustrate a vehicle, indicated generally at 20, in communication with a scan tool, indicated generally at 22. The vehicle 20 includes an engine 24 and transmission 26 connected to a driveline 28. The engine may be in communication with and partially controlled by an electronic control unit (ECU) 30, and the transmission in communication with and partially controlled by a transmission control unit (TCU) 32. The two units 30, 32 may be in communication with one another through a data communication network 34. The data communication network 34 may have a vehicle connector 36 through which one may access the data in the ECU 30 and/or TCU 32.

As an alternative or in addition to the vehicle connector 36, the data communication network 34 may include a wireless transmitter 38 through which the data may be accessed. With the more widespread use of telematics in modern vehicles, the wireless transceiver 38 may be employed to allow one to perform remote diagnostics and prognostics. Such systems may include, for example, satellite systems (not shown) or mobile phone networks (not shown).

In addition, while the ECU 30 and TCU 32 are shown separately, they may be integrated into a single control unit, if so desired. Moreover, the vehicle 20 may include other control units that are in communication with or integrated with the ECU 30 and TCU 32, and the system and method of the present invention may be employed with any or all of these control units, if so desired.

The ECU 30 includes input/output ports 40 for communicating with various vehicle sensors (not shown), switches (not shown), actuators (not shown), other control units, etc. Since the devices with which an ECU 30 may communicate are known to those skilled in the art, they will not be discussed further herein. The ECU 30 may also include a controller 42 having a central processing unit (CPU) 44, read only memory (ROM) 46, random access memory (RAM) 48, and onboard nonvolatile memory 50, also known as keep alive memory (KAM). Stored within the onboard nonvolatile memory 50 are a series of parameter identifiers (PID) 52, each associated with particular types of vehicle components, subsystems, and/or vehicle functions. The PID 52 will be discussed in more detail below relative to FIG. 3.

The scan tool 22 may be in the form of a stand alone unit, a laptop computer, part of a computer system connected through a network (not shown), or some other electronic processor and display system. The scan tool 22 may include a display, such as a monitor 54 or printer (not shown), an input device, such as a keyboard 56, and a scan tool processor 58. When the term display is used herein, this includes any typical form of presenting the data in a human readable form, such as, for example, with a computer monitor, a paper printout, etc. The scan tool processor 58 may include a tool controller 60 having a central processing unit (CPU) 62, read only memory (ROM) 64, random access memory (RAM) 66, and a mass storage device, such as an optical or magnetic disk drive 68. The scan tool 22 also includes a tool connector 70 for connecting to the vehicle connector 36. Alternatively, or in addition, the scan tool 22 may include or be in communication with a wireless transceiver 72 that can transfer data with the wireless transceiver 38 on the vehicle 20.

Figure 3:
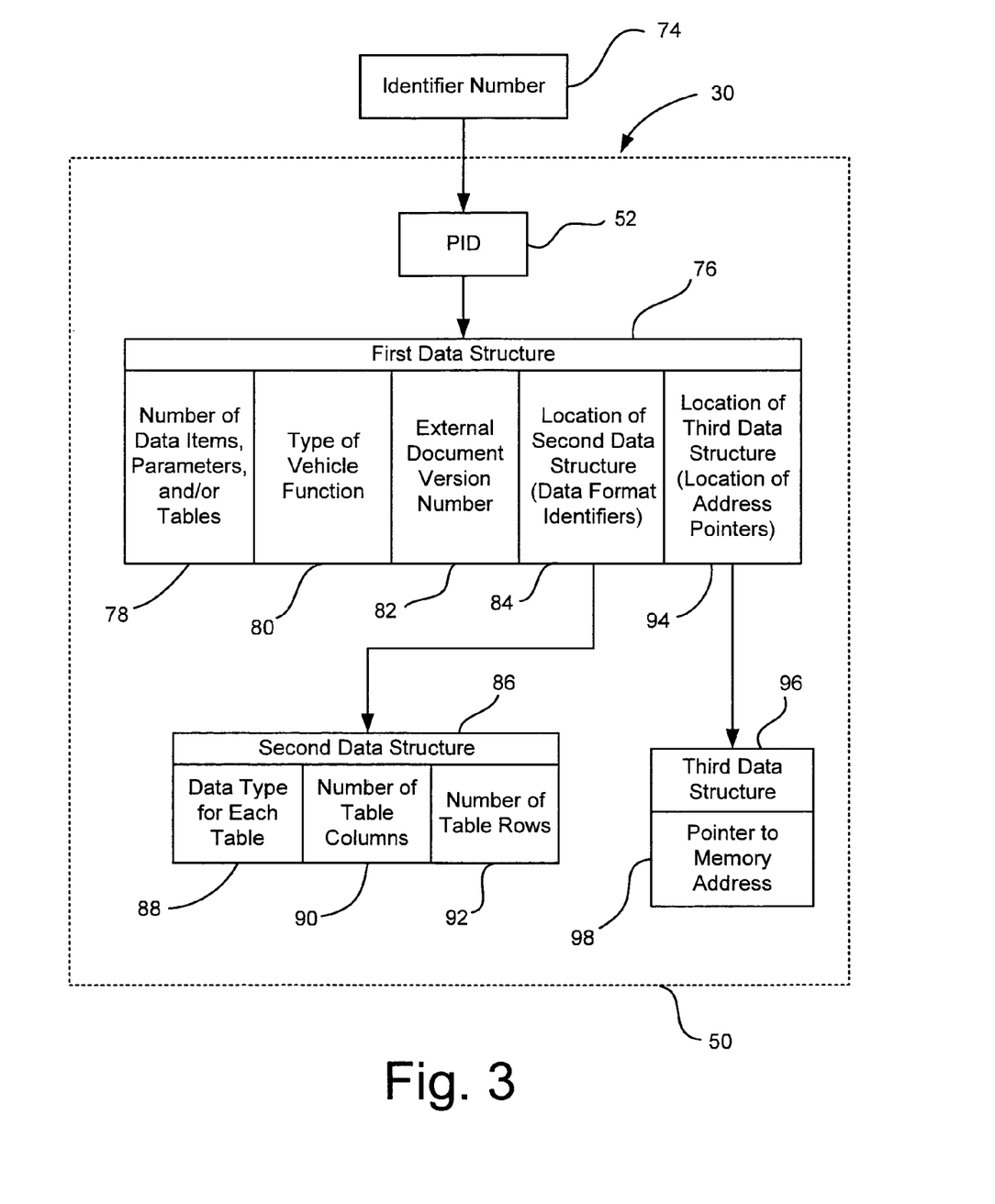
FIG. 3 is a schematic diagram showing a data structure layout for locating and retrieving data stored in onboard memory of a vehicle electronic control unit.

FIG. 3 is a data structure layout for locating and retrieving data stored in the onboard nonvolatile memory 50 of the vehicle electronic control unit 30. As discussed above, a series of parameter identifiers (PID) 52, each associated with particular types of vehicle components, subsystems, and/or vehicle functions are stored within the onboard nonvolatile memory 50. FIG. 3 illustrates the data structure layout for one PID 52, with each PID having the same type of data structure layout.

The first PID 52 is associated with an identifier number 74. Each PID 52 will be associated with its own unique identifier number 74. The identifier number 74 is the same for all vehicle applications. That is, a service technician (or vehicle developer, etc., as the case may be) will enter into the scan tool 22 one particular identifier number 74 when desiring to obtain data relating to, for example, a transmission adaptive pressure table data. That same identifier number 74 will be employed to request adaptive pressure table data across most—and preferably all—vehicle lines for a given vehicle manufacturer. The second PID is associated with a different identifier number that a service technician will enter into the scan tool 22 when desiring to obtain data relating to, for example, electronic throttle control freeze frame data. Accordingly, each type of component, subsystem, and/or function for which retrievable data is stored with have its own unique identifier number. The particular data contained in the PID 52, however, may vary from vehicle application to vehicle application.

The data contained in each PID 52 is an address of a memory location for a first data structure 76 in the nonvolatile memory 50 of the ECU 30. This first data structure 76 contains five members, with each being a thirty-two bit unsigned number. A first member 78 is the number of data items, parameters or tables to be retrieved. A second member 80 is the component or function type that the data items relate to.

For example, electronic transmission adaptive pressure table data or electronic throttle control freeze frame data. A third member 82 indicates the particular version of the external documentation associated with the particular component or function type. The external documentation will be discussed below relative to FIGS. 6 and 7.

A fourth member 84 is a starting address memory location for a second data structure 86. The second data structure 86 contains three members, with each element of each member being an eight bit unsigned number. This second data structure 86 provides data format information for each data item, parameter or table. The dimensions of the second data structure 86 are determined by the number of data items, parameters or tables to be retrieved, which is found in the first member 78 of the first data structure 76. A first member 88 of the second data structure 86 indicates the data language of the data items, parameters or tables. A second member 90 of the second data structure 86 indicates the number of columns for the corresponding data item, parameter or table, while a third member 92 of the second data structure 86 indicates the number of rows for the corresponding data item, parameter or table.

A fifth member 94 of the first data structure 76 is an address memory location for a third data structure 96. The third data structure 96 contains one member 98, with each element of this member 98 being a thirty-two bit unsigned number. This one member 98 contains the starting memory address for each data item, parameter or table, with the data located at each memory address corresponding to the type indicated in the second data structure 86. The dimension of the third data structure 96 is determined by the number of data items, parameters or tables to be retrieved, which is found in the first member 78 of the first data structure 76.

Thus, with an identifier number 74 that stays the same from vehicle application to vehicle application, a technician can readily extract the desired data for a particular component or function, while the PID 52 and data structures 76, 86, 96 allow for flexibility in arranging, storing, and even changing the location and format of the actual data stored in the nonvolatile memory 50 for that particular component or function.

Figure 4:
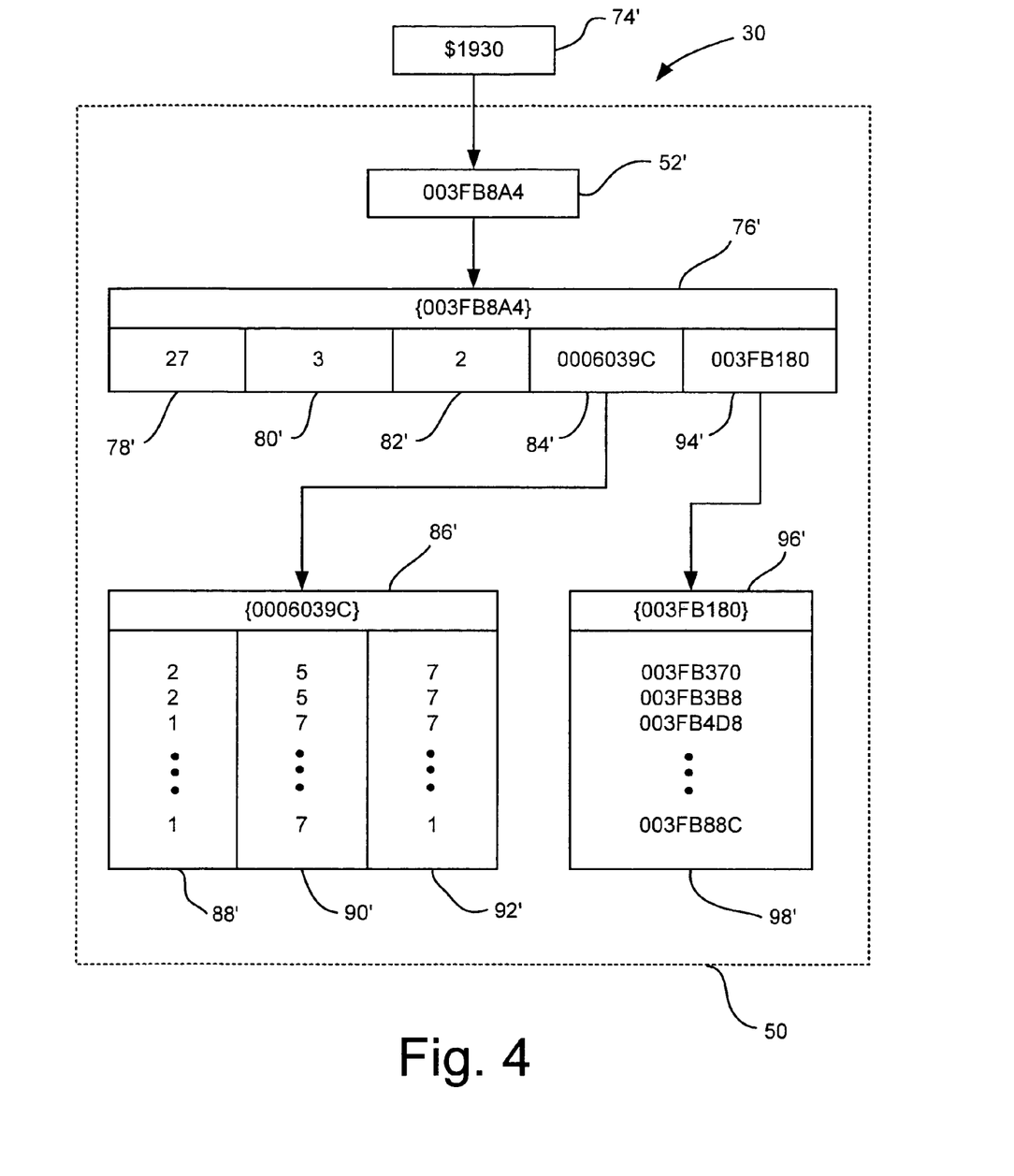
FIG. 4 is a schematic diagram similar to FIG. 3, but illustrating a specific example of a data structure layout.

FIG. 4 shows a specific example of the data structure layout as discussed relative to FIG. 3. The service technician, through the scan tool 22 (show in FIGS. 1 and 2), will input the identifier number 74' for the particular type of component or function data desired. The identifier number 74' may be, for example $1930, when desiring to obtain electronic transmission adaptive pressure table data. This particular identifier number 74' of $1930, then, is preferably the same number that the service technician will enter for any vehicle across all vehicle lines of a particular manufacturer when desiring to obtain electronic transmission adaptive pressure table data. The data value of the PID 52' corresponding to that identifier number 74', for example 003FB8A4, which is an address for a memory location, will then be read. While the identifier number 74' will be the same across vehicle lines, the address in the PID 52' may vary from vehicle line to vehicle line. This keeps the process simple and efficient for the service technician, while still providing maximum flexibility for computer programmers to make updates to the ECU 30 and vary location, amount and formatting of the data that is stored in the nonvolatile memory 50.

After receiving the address of the memory location from the PID 52', the scan tool 22 performs direct memory requests to obtain the first four members of the first data structure 76'. The first member 78' may have a value of, for example, twenty seven, which indicates that there are twenty seven data items, parameters or tables associated with the transmission adaptive pressure table data. The second member 80' may be, for example, three, which corresponds to the particular type of function to which the data applies. The third member 82' may be, for example, two, which means that the data retrieved will correspond to and can be presented correctly in an external version document number two associated with transmission adaptive pressure tables. The fourth member 84' may be, for example, 006039C, which is a pointer indicating the starting memory address for the second data structure 86'. Again, this provides flexibility to the programmers for determining where to store data in the nonvolatile memory 50 while being transparent to the service technician.

The first member 88' of the second data structure 86' includes integer values corresponding to the data language of the data items, parameters or tables. For example, an integer value of one may be used to indicate the data of the corresponding item, parameter or table is a signed eight bit item, an integer value of two may be used to indicate that the data of the corresponding item, parameter or table is a signed sixteen bit item, an integer value of 3 may be used to indicate that the data of the corresponding item, parameter or tale is an unsigned eight bit item, etc. The number of integer values to read in the first member 88' will be twenty seven, which is known since the first member 78' of the first data structure 76' has already been retrieved. The second and third members 90', 92' provide information relating to the format of the data. The second member 90' indicates the number of columns for each data item, parameter or table—for example, five or seven columns of data. The third member 92' indicates the number of rows for each data item, parameter or table—for example, seven or one.

With the format for each data item, parameter or table now known, the locations are now needed. The fifth member 94' of the first data structure 76', may be, for example 003FB180, which is a pointer indicating the starting memory address for the third data structure 96'. The one member 98' has twenty seven pointers indicating the starting memory addresses for each of the data items, parameters or tables in the nonvolatile memory 50. The scan tool 22 now has all of the information needed to retrieve the onboard data relating to the transmission adaptive pressure tables.

Figure 5:
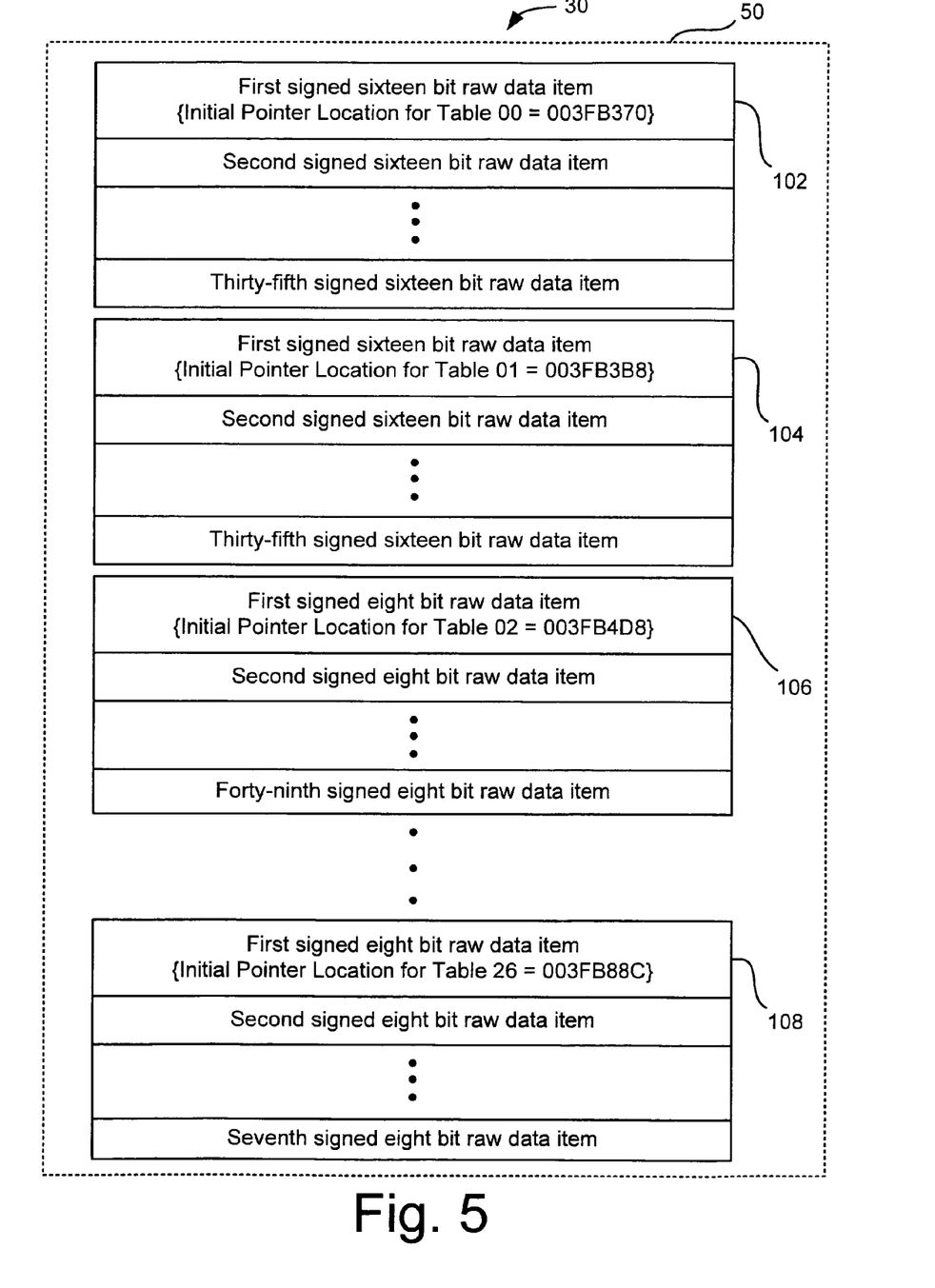
FIG. 5 is a schematic diagram showing an example of the stored onboard data that is retrievable by employing the data structure layout of FIG. 4.

FIG. 5 shows an example of the onboard data stored in the nonvolatile memory 50 of the ECU 30 that is retrievable by employing the data structure layout of FIG. 4. The scan tool 22 (shown in FIGS. 1 and 2), having retrieved all of the information relating to the amount, type, format, and location of the data, performs direct memory requests to retrieve the actual raw data itself. The first table 102 (table number 00) has a starting memory address of 003FB370 and has thirty five raw data items, each being in a signed sixteen bit format. The second table 104 (table number 01) has a starting memory address of 003FB3B8 and has thirty five raw data items, each being in a signed sixteen bit format. The third table 106 (table number 02) has forty nine raw data items, each being in a signed eight bit format. The retrieval of the raw data continues through the twenty seventh table 108 (table number 26) that has seven raw data items, each being in a signed eight bit format. The scan tool 22 now has the raw data, but it is not at this point in a user friendly format for the service technician.

Figure 6:
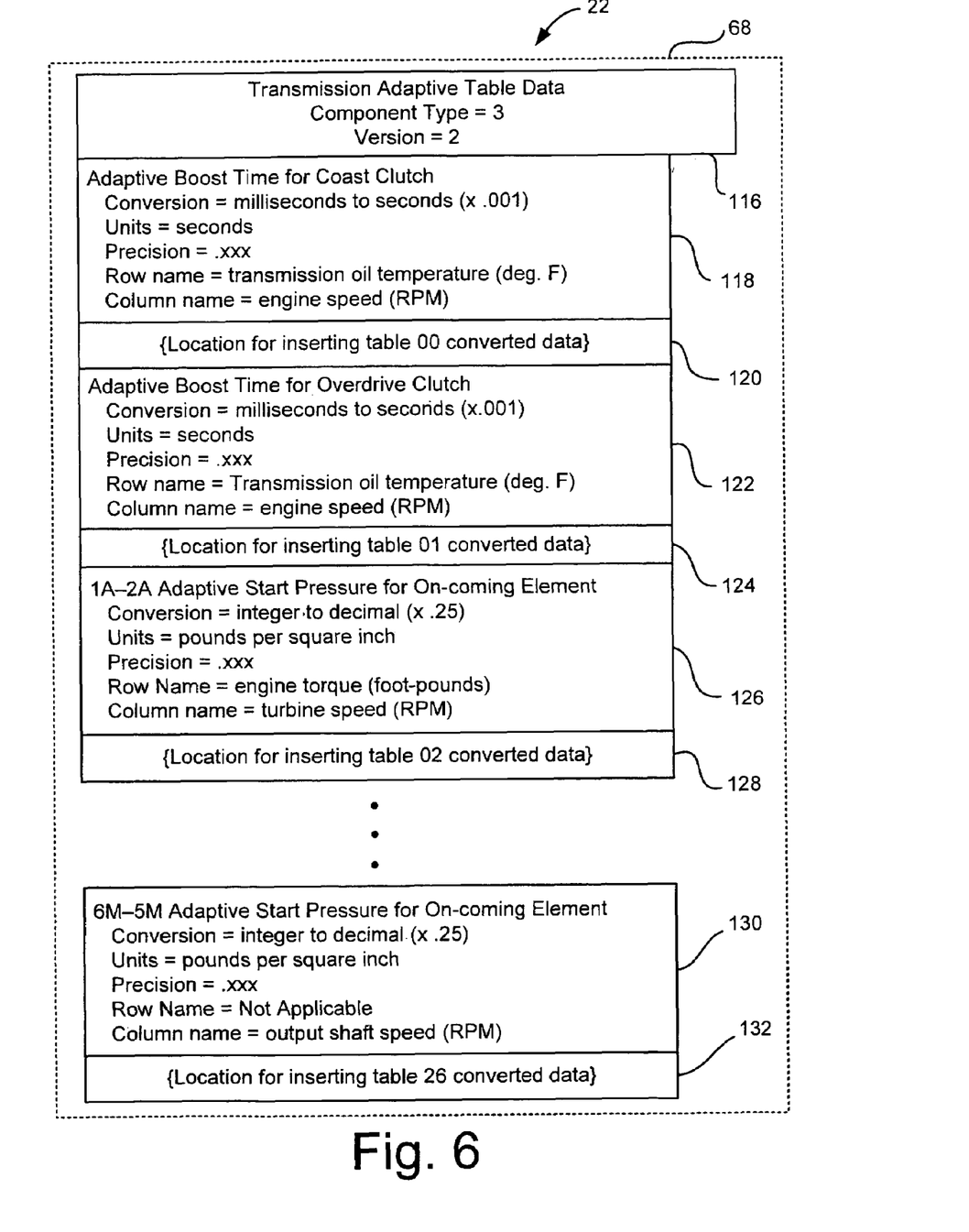
FIG. 6 is a schematic diagram of a sample version document stored in a scan tool.

FIG. 6 shows a sample version document 114 stored in a disk drive 68 of the scan tool 22. For the example illustrated in FIGS. 4 and 5, this would be version two of the external document relating to electronic transmission adaptive pressure table data. The particular version document 114 will be formatted and have labels that correspond to the type, order and formatting of the data stored onboard the vehicle for the vehicle component or function of interest. Thus, for each vehicle component and function, and for each situation where different information is collected for the particular component or function, a different version document will be employed. The scan tool 22 will be able to match the retrieved onboard data with the correct version document by looking at the second and third members 80, 82 of the first data structure 76 (shown in FIGS. 3 and 4).

The version document 114 may include, for example, a heading 116 that provides the service technician with the type of component and/or function to which the data applies, as well as the component type and version number of the document. A first block of text 118 includes a name or description of the type of data contained in the first table, as well as preferably useful information, such as any conversion factor, the applicable units, precision, and names for the row and column (axis information). An insertion location 120 is provided for inserting the data from the first table (table number 00) in its converted and formatted condition. A second block of text 122 includes the name of the type of data in the second table and other needed information, with a second insertion location 124 for inserting data from the second table (table number 01). A third block of text 126 includes the name of the type of data in the third table and other needed information, with a third insertion location 128 for inserting data from the third table (table number 02). Of course, the version document 114 repeats this format down to the twenty seventh block of text 130 that defines the twenty seventh table (table number 26) of converted and formatted data 132 that will be inserted thereafter.

One will note that all of this information relating to the version document 114 is stored off-board in the scan tool 22. This significantly reduces the amount of data that must be stored onboard the vehicle and also the amount of data that must be transferred from the vehicle to the scan tool, while still allowing the data to be presented in a user friendly format. Even so, it is still relatively easy to assure that the data is presented properly and in an easily usable format since, when the amount, formatting, etc. of the onboard data changes, the PID and document version can be easily changed to accommodate this. Moreover, if the particular scan tool being employed does not recognize the document version number, it can have a default backup display format where the data will just be output in the raw data format employed in the prior vehicle data retrieval systems.

Figure 7:
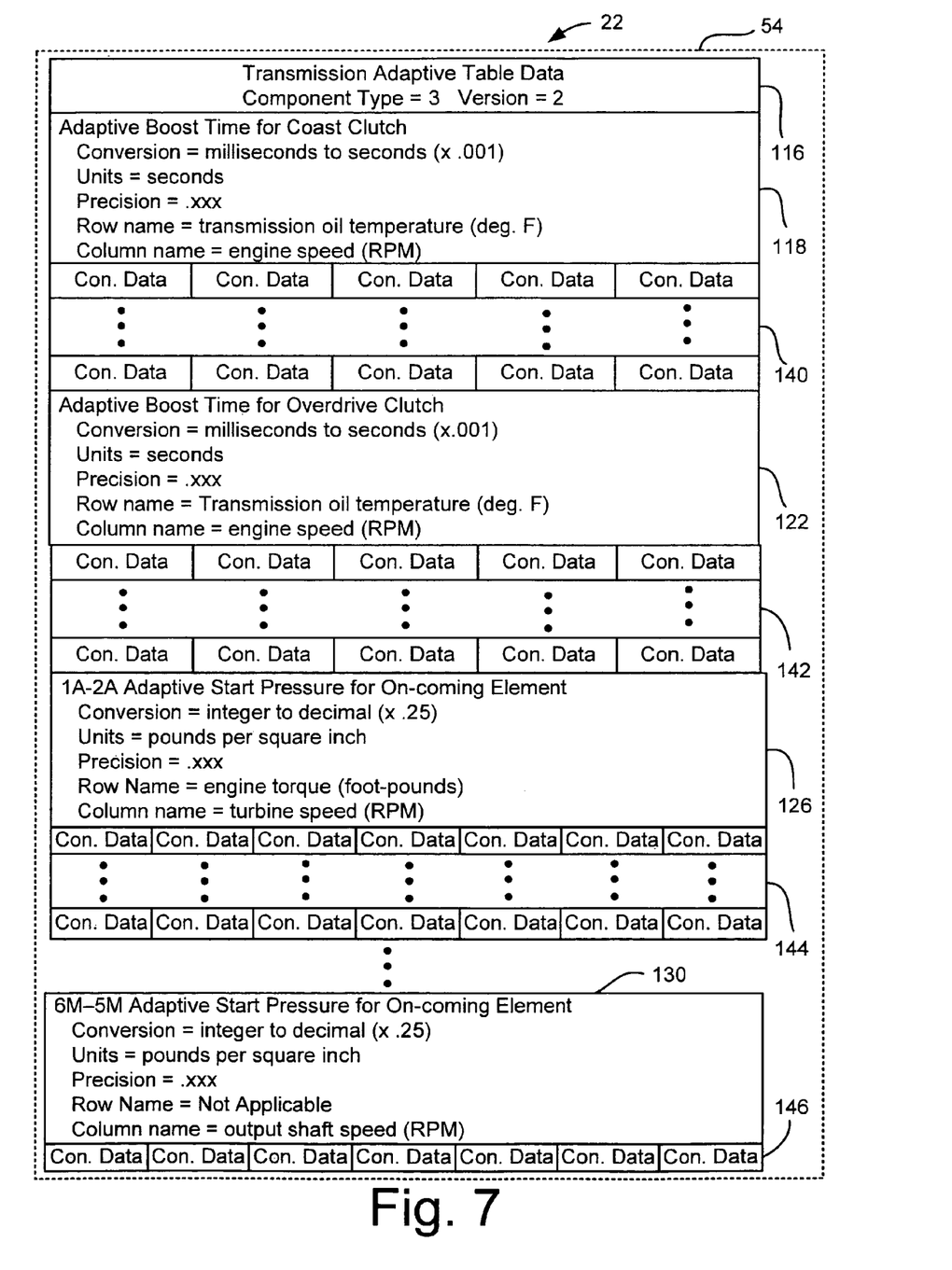
FIG. 7 is a schematic diagram of the version document of FIG. 6 after the stored onboard data of FIG. 5 is retrieved and converted employing the process of the present invention.

FIG. 7 shows the version document of FIG. 6 after the stored on-board data of FIG. 5 is retrieved and converted employing the process of the present invention. This shows how the retrieved data would be shown on the display 54 of the scan tool 22, or alternatively printed out for the service technician to view. All of the data is now retrieved and shown in a user friendly format. The heading 116 assures the technician that the information for the desired component or function was retrieved. The blocks of text 118, 122, 126, 130 provide the service technician with the context for the converted data that is displayed in the respective tables of converted data 140, 142, 144, 146. Thus, the service technician has a user friendly presentation of the data retrieved from the vehicle.

Figure 8A:
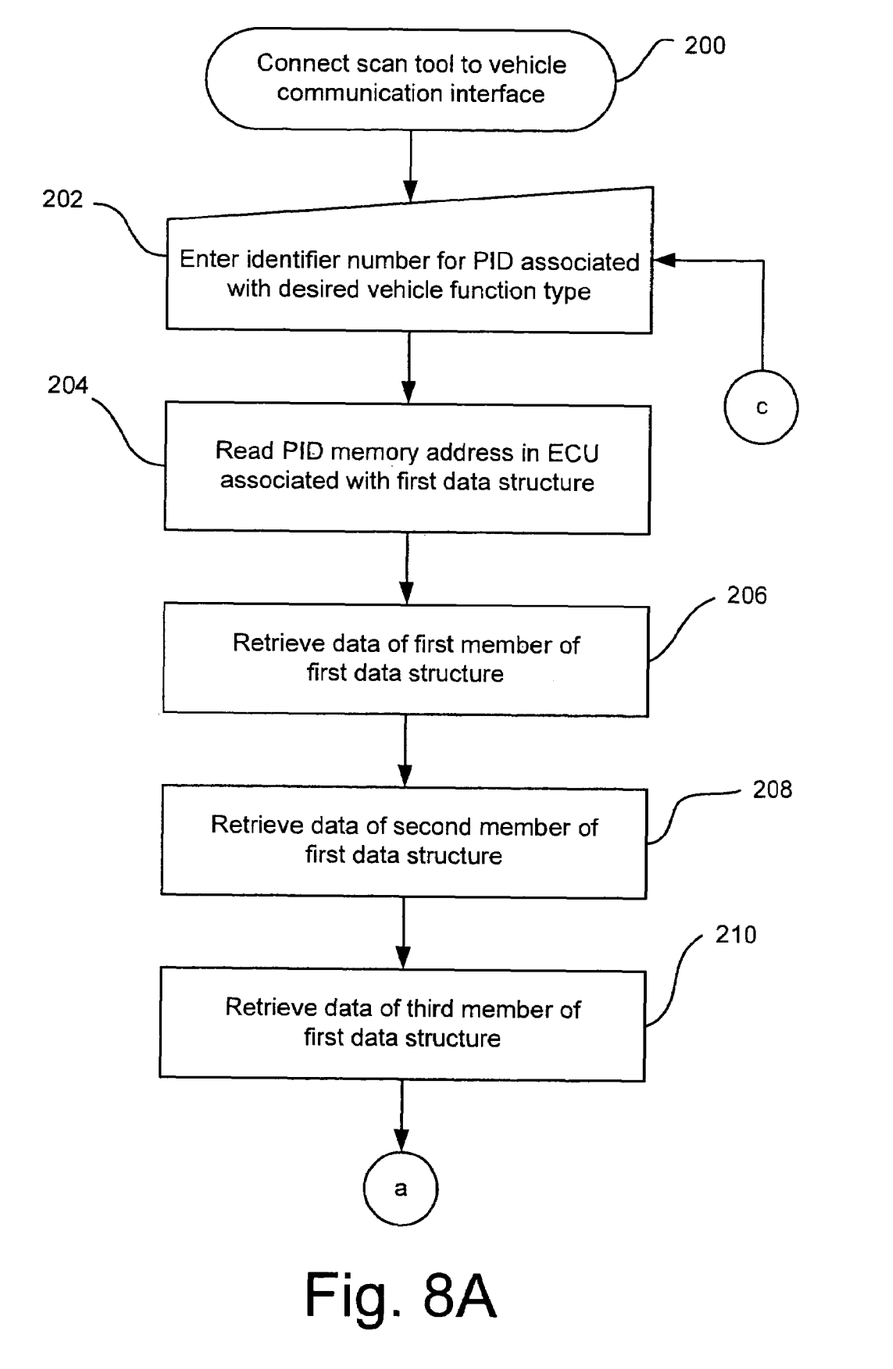
FIGS. 8A-8C are a flow chart illustrating a method of retrieving, converting and formatting data from a vehicle electronic control unit in accordance with the present invention.
Figure 8B:
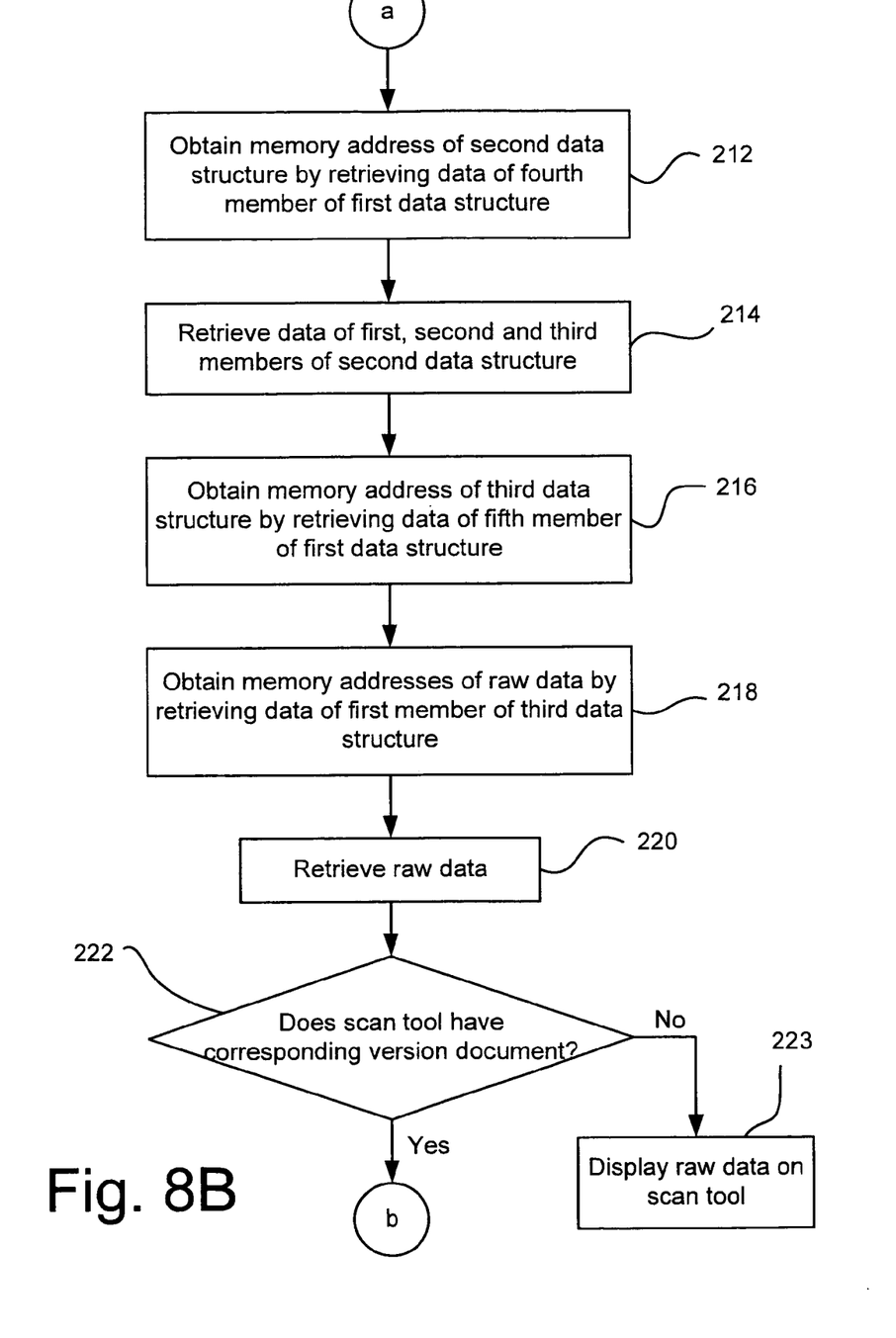
Figure 8C:
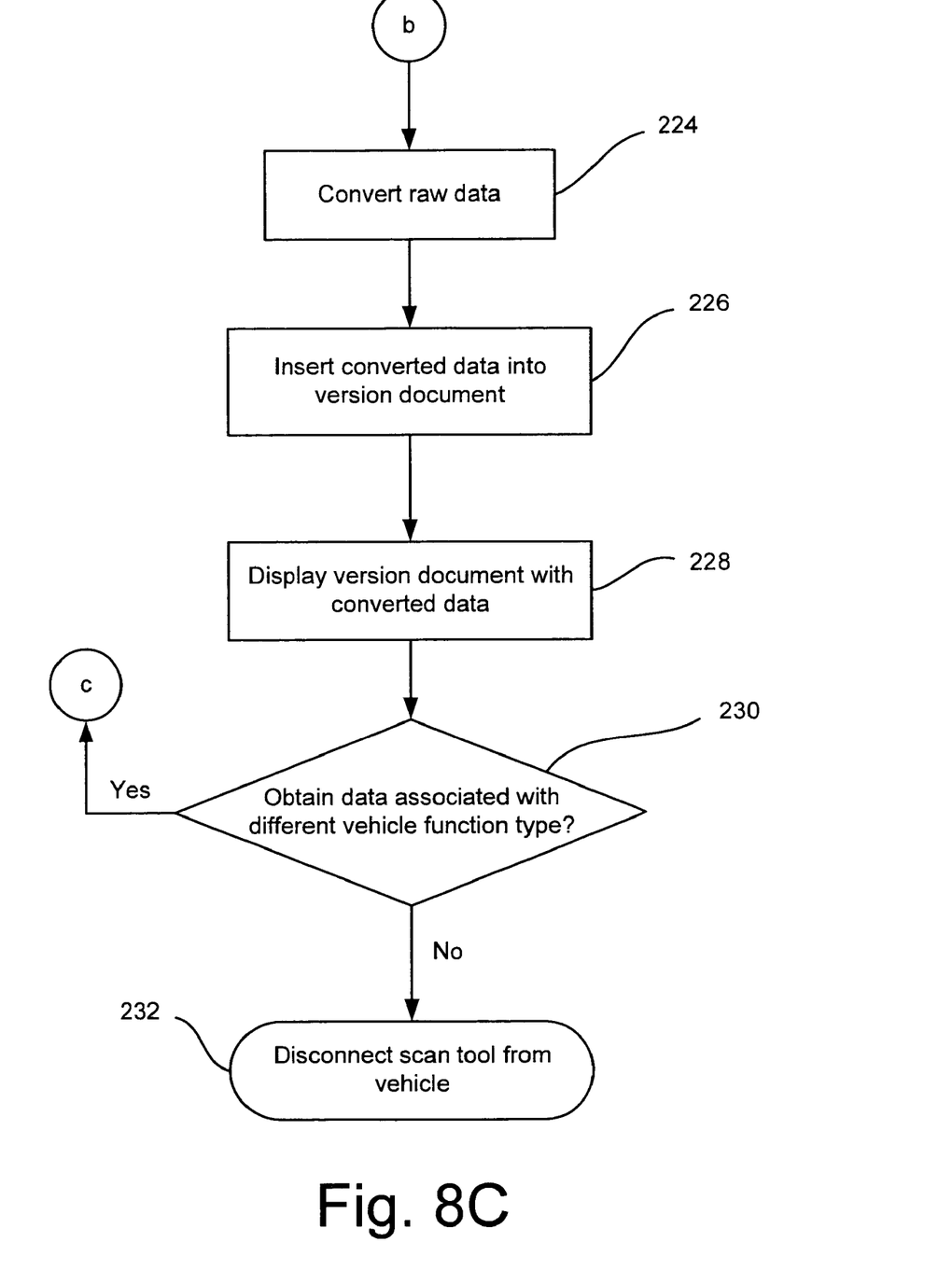

FIGS. 8A-8C are a flow chart illustrating a method of retrieving, converting and formatting data from a vehicle electronic control unit as applied to the system of FIGS. 1-7. The scan tool 22 is connected to the data communication network 34 via the vehicle connector 36, block 200. As an alternative, this connection may be made wirelessly, as discussed above relative to FIGS. 1 and 2.

A service technician enters the identifier number 74 into the scan tool 22 to retrieve the PID 52 associated with the desired vehicle component and/or function type, block 202. The memory address in that PID 52 is retrieved from the ECU 30, block 204, which provides the location of the first data structure. The data of the first member 78 of the first data structure 76 is retrieved, block 206, indicating the number of data items, parameters or tables stored in the nonvolatile memory 50 associated with the vehicle component and/or function type of interest. The data of the second member 80 of the first data structure 76 is retrieved, block 208, providing the type of vehicle function associated with this data. The data of the third member 82 of the first data structure 76 is retrieved, step 210, providing the version number of the external document associated with this data.

A memory address of the second data structure 86 is obtained by retrieving the fourth member 84 of the first data structure 76, block 212. The dimensions of this second data structure 86 are known from the first member 78 of the first data structure 76. The data of the first, second and third members 88, 90, 92 of the second data structure 86 are retrieved, block 214. The format, including the language type and dimensions, of each raw data item is now known. A memory address of the third data structure 96 is obtained by retrieving the fifth member 94 of the first data structure 76, block 216. The dimensions of this third data structure 96 are also known from the first member 78 of the first data structure 76. The memory addresses of the raw data contained in the one member 98 of the third data structure 96 are retrieved, block 218. Now, in addition to the amount, type and format, the location for each raw data item is known.

The raw data is now retrieved from the nonvolatile memory 50 by the scan tool 22, block 220. A check is made to determine if the scan tool 22 has the correct version document corresponding to this data, block 222. If not, then the scan tool 22 displays the raw data, block 223. If the correct version document 114 is present, the raw data is converted to match the format, units, precision, etc. for the version document 114 into which it will be placed, block 224. The particular version document 114 into which the data will be inserted is known from the second and third members 80, 82 of the first data structure 76. The converted data is inserted into the version document 114, block 226, and the version document 114 with the converted data is shown on the display 54 (or printed), block 228. If the service technician wishes to access and display onboard data associated with a different vehicle component or function, block 230, then a new identifier number can be entered in the scan tool 22. If the retrieval of onboard data is complete, then the tool connector 70 is disconnected from the vehicle, block 232.

As one can readily see from the description of the system and process described above, this system and process can handle variations in the stored data, which may include, for example, multiple and changing addresses, multiple and changing data types, multiple and changing data sizes and formats, multiple and changing data conversions, which includes names of data, units of measurement, precision, conversion factors, etc. All of these variations can be handled while providing a simple, user friendly way for a service technician to retrieve and view the onboard data. Moreover, the system and process significantly reduces the amount of data that must be stored onboard the vehicle and transmitted through its data communications network.

While certain embodiments of the present invention have been described in detail, those familiar with the art to which this invention relates will recognize various alternative designs and embodiments for practicing the invention as defined by the following claims.

What is claimed is:

1. A method of retrieving and displaying data from an onboard memory of an electronic control unit of a vehicle, the method comprising the steps of:
communicating an identifier number from a scan tool to the electronic control unit, wherein the identifier number is associated with a vehicle component or a vehicle function;
communicating, from the electronic control unit to the scan tool, a memory address for a first data structure from a parameter identifier corresponding to the identifier number;
communicating, from the electronic control unit to the scan tool, an amount, formats and locations of data in the onboard memory;
communicating, from the electronic control unit to the scan tool, a version document number;
retrieving the data from the onboard memory to the scan tool;
storing a version document corresponding to the version document number in the scan tool;
inserting the retrieved data from the onboard memory in the version document; and
displaying the version document with the retrieved data inserted therein.

2. The method of claim 1 wherein the first data structure is further defined by a first member indicative of the amount of data, a second member indicative of the vehicle component or the vehicle function, and a third member indicative of the version document number.

3. The method of claim 2 wherein the first data structure is further defined by a fourth member defining a memory address for a second data structure that includes the format of the data.

4. The method of claim 3 wherein the first data structure is further defined by a fifth member defining a memory address for a third data structure that includes memory address information for the locations of the data.

5. The method of claim 1 further including the step of displaying the retrieved data on the scan tool without being inserted in the version document if the retrieved data cannot be properly inserted into the version document stored on the scan tool.

6. The method of claim 1 further including the steps of communicating a second identifier number from the scan tool to the electronic control unit, wherein the second identifier number is associated with a different vehicle component or vehicle function than the identifier number.

7. The method of claim 1 wherein the identifier number corresponds to the vehicle function of adaptive pressure table data for an electronic transmission.

8. The method of claim 1 further including the step of connecting the scan tool to a vehicle communication interface that operatively engages the electronic control unit.

9. The method of claim 1 wherein the step of retrieving the data from the onboard memory to the scan tool is further defined by transmitting the data wirelessly between the vehicle and the scan tool.

10. The method of claim 1 wherein the step of displaying the version document is further defined by displaying the version document with the retrieved data inserted therein on a monitor.

11. A system for retrieving and displaying data from a vehicle, the system comprising:
an electronic control unit located in the vehicle having nonvolatile memory including a parameter identifier with a changeable memory address stored therein that is accessible via an identifier number associated with a vehicle component or function, and a first data structure beginning at the memory address that includes amount, location, and version document number information; and
a scan tool including a device for selectively communicating with the electronic control unit, and including a mass storage device with a version document stored therein corresponding to the version document number information stored in the nonvolatile memory of the electronic control unit, and a display capable of displaying the version document with data retrieved from the vehicle inserted therein.

12. The system of claim 11 further including a transmission control unit located in the vehicle in communication with the electronic control unit.

13. The system of claim 11 further including a data communication network in the vehicle that operatively engages the electronic control unit and includes a vehicle connector that is selectively connectable to the scan tool.

14. The system of claim 11 wherein the first data structure includes a first member indicative of the amount of the data, a second member indicative of the vehicle component or function to which the data relates, and a third member that includes the version document number.

15. The system of claim 14 wherein the first data structure further includes a fourth member defining a memory address for a second data structure that includes formatting information for the data, and a fifth member defining a memory address for a third data structure that includes the locations corresponding to the data.

16. The system of claim 11 further including a first wireless transceiver located in the vehicle and operatively engaging the electronic control unit, and a second wireless transceiver operatively engaging the scan tool and selectively in communication with the first wireless transceiver.

17. The system of claim 11 wherein the display is a monitor.

18. An electronic control system for use in a vehicle comprising:
a data communication network adapted to selectively communicate with a scan tool; and
an electronic control unit including a controller operatively engaging the data communication network to receive and transmit data thereon, and nonvolatile memory in communication with the controller and including a parameter identifier having a memory address for accessing a first data structure, wherein the first data structure includes a first member indicative of an amount of data, a second member indicative of a vehicle function to which the data relates, and a third member indicative of a corresponding external document for inserting the data therein and displaying the external document.

19. The control system of claim 18 wherein the first data structure further includes a fourth member defining a memory address for a second data structure, and the second data structure includes formatting information corresponding to the data.

20. The control system of claim 19 wherein the first data structure further includes a fifth member defining a memory address for a third data structure, and the third data structure includes memory address information corresponding to the data.

* * * * *